March 6, 1973 P. K. PATEL ET AL 3,719,525

MAGNETIC RECORD MEMBERS HAVING A PROTECTIVE RECORDING SURFACE AND METHOD OF MAKING

Filed Jan. 9, 1969

INVENTORS
PRAVIN K. PATEL
JOO H. LIU

BY Louis A Kline
John J. Matlago
THEIR ATTORNEYS

United States Patent Office 3,719,525
Patented Mar. 6, 1973

3,719,525
MAGNETIC RECORD MEMBERS HAVING A PROTECTIVE RECORDING SURFACE AND METHOD OF MAKING

Pravin K. Patel, Los Angeles, and Joo H. Liu, Monterey Park, Calif., assignors to Control Data Corporation, Minneapolis, Minn.

Filed Jan. 9, 1969, Ser. No. 790,129
Int. Cl. H01f *10/06*
U.S. Cl. 117—237 2 Claims

ABSTRACT OF THE DISCLOSURE

A record disc having a protected thin-film magnetic record surface is disclosed wherein the magnetic record medium comprises a thin-film of cobalt-phosphorous and a protective overlayer including in combination thin-film oxides formed on the surface of the record medium and firmly bonded thereto by a process including heating in an air-flow oxidizing atmosphere and in a temperature range from 220° C. to 280° C. for a period of time sufficient to form said thin-film of oxides on the surface of the record medium, and a thin-film lubricant of silicone oil which is made integral with the oxides of the overlayer for permanent retention thereby.

Figure 1:
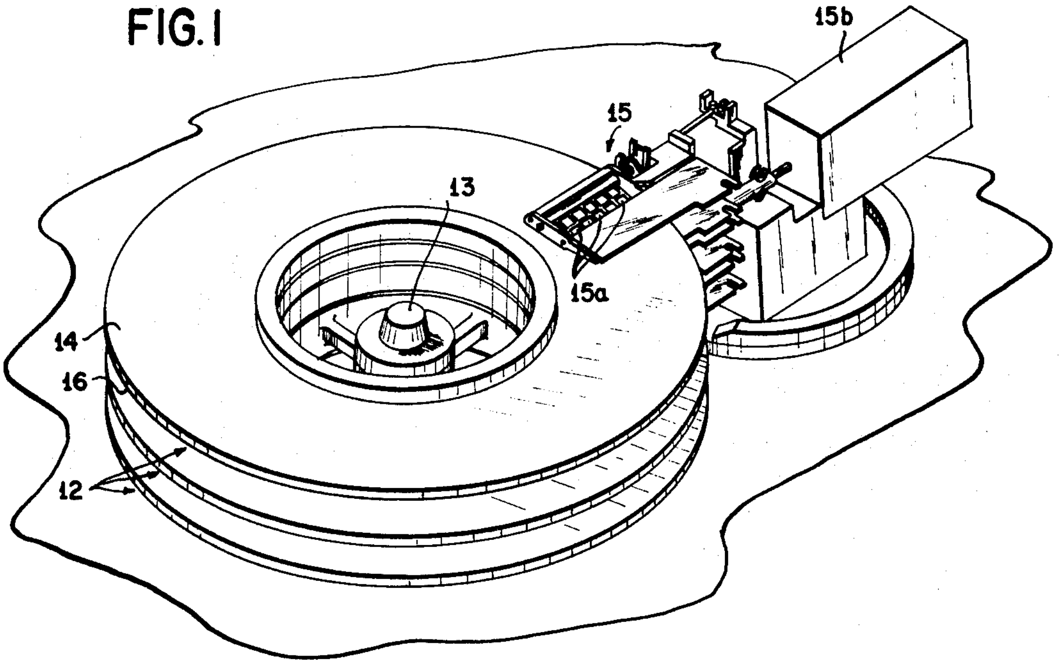

The present invention is directed to magnetic record members and, more particularly, to improved magnetic record surfaces of record members for recording digital data.

In recording and reproducing data on magnetic record surfaces of magnetic recording systems, the record surfaces are often subjected to excessive and undesirable abrasion and galling by direct contact of the record surface with a magnetic record head assembly, including one or more record heads. Further, it has been found that serious damage to the record surface requiring replacement of the record member occurs in many recording systems within a relatively short period of time after recording and reproducing operations commence.

At the present time, many magnetic recording systems have been developed and are in use which employ record members having an iron oxide type of record medium which also includes an adhesive binder of an abrasion resistant material. This composite recording medium has been found to be deficient in many respects in prior recording systems and unsatisfactory for present systems requiring higher density recording of digital data. In many instances, no protective overlayer is provided for the magnetic oxide type recording medium and occasionally direct contact is inadvertently made with the magnetic recording heads during use. While the magnetic oxide record medium is durable because of abrasion resistant materials included therein, the degree of durability is often inadequate and frequent replacement of record members is required which necessitates frequent re-recording of data. In addition, a more serious problem is encountered by occasional galling of the magnetic oxide type medium which causes complete loss of recorded data in the damaged area of the record surface and, further, ruins the record surface such that no new data can be recorded in the damaged area. Improvements in this magnetic oxide type of record member are disclosed in a commonly assigned U.S. Pat. No. 3,184,724 to E. H. Irasek in which an overlayer is provided consisting of a copolymer of vinyl acetate and vinyl chloride. While the overlayer described in that patent does provide improved resistance to wear, the copolymer does not provide a lubricant, as such, and does not provide many additional features and advantages of the present invention. Further, many presently operating recording systems using magnetic oxide type record surfaces are not considered satisfactory because of their limited capacity (density) for recording data in a predetermined recording surface area as well as their limited resistance to abrasion and galling.

In accordance with a commonly assigned prior copending U.S. patent application of Peters et al., Ser. No. 598,292, filed Dec. 1, 1966, and now U.S. Pat. No. 3,466,156, application of a thin-film of natural or synthetic waxes to certain types of surfaces has been found to substantially increase their resistance to abrasion and galling and also substantially increase their resistance to corrosion. The required wax thin-film surface is obtained even with highly polished metals by first applying a synthetic polymer thin-film to the latter and subsequently using this polymer thin-film surface as the substrate for permanent retention of the wax thin-film. In order to obtain resistance to abrasion, galling and corrosion, a synthetic polymer is chosen which adheres strongly to the metal surface of the record medium. The polymer is also chosen so that the required wax thin-film overcoating will firmly adhere thereto. The resulting record medium is thus highly durable in that the protective overlayer prevents the record head from having an abrasive or galling type of engagement with the record medium which can progress to the type of contact resulting in highly damaging head crashes.

Briefly, the present invention is directed to a further improved magnetic record member and method for making the same of the type disclosed in the copending Peters et al. patent application. The present record member employs an aluminum alloy base substrate having a multilayer structure thereon comprising a layer of non-magnetic nickel (nickel-phosphorous), a layer of a thin-film of metal which serves as the magnetic record medium and has a protective overlayer comprising a novel combination of thin-film metal oxides of the record medium formed thereon, and a thin-film lubricant covering the metal oxides. The protective overlayer avoids any need to rely on resistance to abrasion, galling or corrosion by the metal recording medium itself and has been found to be particularly desirable for protection of a thin-film cobalt-phosphorous record medium of high coercivity (e.g. 330±30 oersteds) which is suitable for recording at high densities. Further, the thin-film protective overlayer of cobalt-phosphorous oxides and the thin-film lubricant provide effective protection of the cobalt-phosphorous medium by preventing abrasive contact engagement with opposing surfaces of record head assemblies by the reduced coefficient of friction provided by the combination of Co-P oxides and the lubricant of the protective overlayer wherein the retention of the lubricant by the Co-P overlayer oxides is permanent due to the adsorbent nature of the lubricant and the absorbent nature of the Co-P oxides. Further, the preferred adsorbent lubricant such as silicone oil is selected to have a relatively low vapor pressure whereby it does not evaporate in the system environment.

The term "thin-film" is used herein according to its common technical use, i.e., to designate a film having a thickness of 10,000 A. (angstrom units) or less and retaining "single magnetic domain" characteristics, and preferably, the thin-film, as used herein, is at least 480 angstrom units but less than 6,000 angstrom units thick. The present invention therefore is directed to protection of metallic magnetic thin-film record media, such as cobalt-phosphorous, in which a thin-film provides the desired capacity for high density recording of digital data.

Provision of a protective overlayer of the present invention is effective to prevent abrasion and galling by record heads including multiple-head assembly structures aerodynamically suspended within a film of air moving with a disc rotating at speeds of 1400 r.p.m., for example. In the desired system arrangement, the record heads and other "flying" structural members of the multiple-head assembly are maintained within 100 microinches of the record surface which is well within the layer of air moving with the record surface. In practice it has been found that it is not feasible to attempt to prevent occasional contact of the head structure and the record surface during operation of recording systems particularly wherein close-spacing is desired and, accordingly, it had been found necessary to provide effective protection of the record medium from damage by the opposing surfaces of the record head structure.

The nature of the substrate for the lubricant is important in determining its effectiveness, since retention of the lubricant by the cobalt oxide overlayer is essential for sustained resistance to abrasion, galling and corrosion. In particular, most highly polished metal surfaces offer poor retention of those lubricants which possess the low static and dynamic friction coefficients required to achieve a satisfactory measure of resistance to and deterrence of abrasion and galling. In addition, it has been determined that a lubricated protective overlayer for the record surface is important as a preventive measure, e.g., to prevent contacts developing into head "crashes."

In general, it should be noted, that recording systems providing for spacing between the record surface and heads during recording/reproducing operations include either fixed heads or "flying" heads. The "flying" heads provide an assembly for supporting a head or heads closely spaced above the recording surface during relative movement thereof to the desired depth within a layer of air carried by and moving along with the record surface (laminar flow). An improved record head of this type is disclosed in a commonly assigned copending U.S. patent application, Ser. No. 680,098, filed Nov. 2, 1967. These "flying" heads often are made of aluminum alloys and have a contoured or flat surface opposite the moving record surface which is supported during operation within the film of air. The peripheral edge of this head surface or other head structure is not intended to make contact with the record surface and whenever direct contact does occur, any unprotected or inadequately protected recording medium (e.g., metal thin-film) is abraded inducing further abrasion or galling of the record media. Often, a small vibration, a dust particle, or slight irregularity of certain types in the unprotected record surface will cause the head structure comprising one or more of a group of "flying" heads to tilt and thereby cause the heads to deviate from their close-spaced relationship to the record surface causing an edge thereof to make direct contact with the record surface producing abrasion and/or galling. In turn, the abrasion and galling of the record surface affect the surface, disturbing the laminar air flow necessary to provide the required surface to head spacing whereby more frequent or continuous direct contact of the record head and record surface is produced. The present invention is directed to an improved, thin-film record surface having a firmly bonded protective overlayer of durable oxides of the record medium itself. The protective overlayer provides both wear resistance and a retentive base for lubricants having low coefficients of friction to prevent contacts causing abrasion and galling of the record surface by these record heads.

Accordingly, an object of the present invention is to provide a record member having a record surface which overcomes the problems and disadvantages discussed supra, and thus provides an improved record member for recording equipment.

Another object is the provision of an improved record surface for a record member including a thin-film magnetic record medium of metal formed on a substrate of non-magnetic metal of similar physical and chemical properties.

A further object of the present invention is to provide a record surface having a lubricated thin-film overlayer for protection of the recording medium from harmful contact with a record head structure disposed in close proximity to the record surface during recording and reproducing operations.

Still another object is the provision of a record surface including a thin-film of metal providing for magnetically recording signals at high densities and a lubricated metal oxide overlayer which is effective to prevent abrasion and galling of the record surface by the record heads and also to provide effective protection against corrosion.

Another object is to provide a record surface capable of withstanding repeated momentary or even sustained direct contact with record heads normally spaced therefrom and not intended to make direct contact during recording operations.

Another object is to provide a cobalt-phosphorous magnetic record medium having a protective surface formed thereon by oxidizing the surface of the medium in a manner to provide a uniform thin-film of oxides firmly bonded to the surface of the medium.

A further object of the present invention is to provide an overlayer of lubricated cobalt-phosphorous oxides as a protective surface for a cobalt-phosphorous magnetic record medium.

Figure 2:
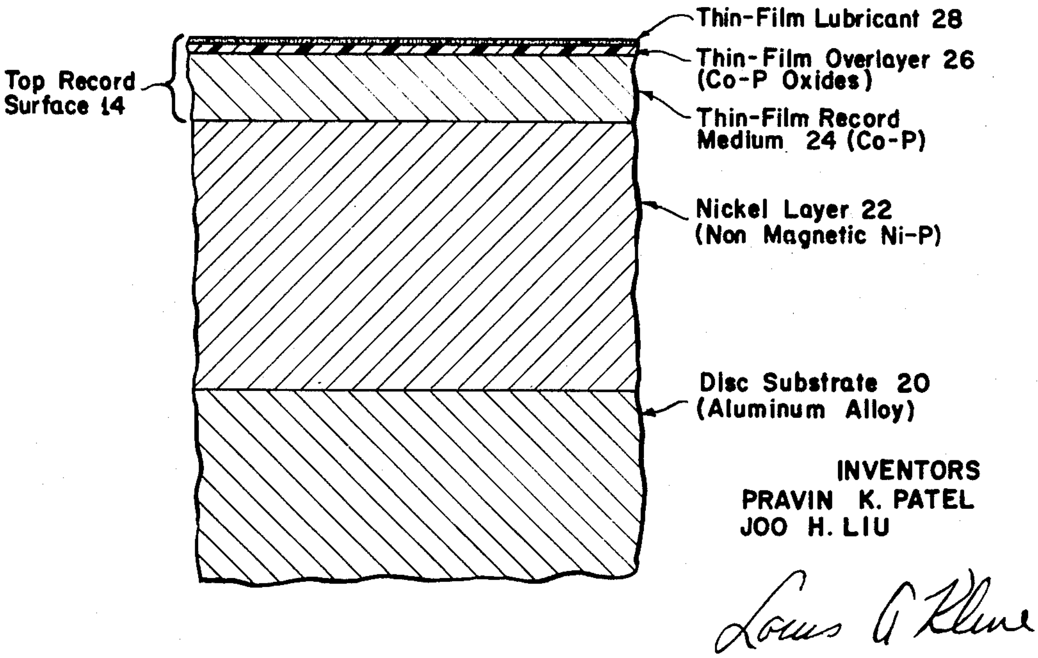

Other objects and features of the present invention will become apparent to those skilled in the art as the disclosure is made in the following detailed description of a preferred embodiment of the present invention as illustrated in the accompanying drawings in which:

FIG. 1 is a perspective view of a magnetic recording system including the preferred record discs for illustrating the present invention; and FIG. 2 is a greatly enlarged cross section of an upper portion only of one of the record discs shown in FIG. 1 showing the improved record surface of the present invention including a composite thin-film protective surface including a thin-film lubricant.

Referring now to the drawings, FIG. 1 shows record disc and head assemblies for a disc type recording system including a plurality of preferred magnetic record members of the present invention in a stack which is removably mounted as a unit on a rotatable spindle 13 of a data storage apparatus for a data processing system, for example. Each of the record members comprises a disc 12 having separate top and bottom record surfaces 14 and 16 which are moved past aerodynamically suspended "flying" record heads **15*a* of the data storage apparatus for recording and reproducing data. Record heads 15*a* are mounted in an adjustable head assembly 15 which is disclosed and described in the previously mentioned copending patent application, Ser. No. 680,098. A separate head assembly 15 is provided for the top and bottom record surfaces 14 and 16 of each of the record discs 12 and the head assemblies are movably supported on a common support 15*b* which provides for radial and rotational movements of the head assembly 15 shown and the other head assemblies for the other surfaces of the record discs 12 indicated in FIG. 1. The radial movement provides for positioning the head assemblies over the desired group of data tracks and the rotational movement provides for clearing the head assemblies for removal and replacement of the stack. Because of the close spacing of the heads 15*a* and the record surfaces 14 during operation, an additional clearance movement is provided in conjunction with the rotational movement to clear the heads 15*a* from the record surface 14. Further, the discs 12 must be moving before lowering the head assembly 15 for cooperation with the record surfaces to provide the "air-film" suspension of the heads 15*a*. Accordingly, continuous direct contact of the record heads 15*a* and record surfaces is avoided and only unavoidable random contact occurs as a result of minute irregularities of the record surface in combination with the extremely close spacing of the heads 15a to the record surfaces 14 and 16. The record heads 15a are resiliently supported for vertical movement in the head assembly 15 in order to ride in the film of air to maintain the heads 15a spaced approximately 30 to 100 micro-inches, for example, away from the record surface 14 of disc 12 as are the other heads in the five head assemblies (not visible) for the other record surfaces of discs 12**.

Referring now more particularly to the top record disc 12 shown in FIG. 1, surfaces 14 and 16 are formed on an aluminum alloy disc. substrate 20 (FIG. 2) which is sufficiently thick (e.g., .125 inch) to provide and maintain uniform flatness of the disc 12 for recording on the recording surfaces 14 and 16 by the closely spaced "flying" record heads 15a in assembly 15; in assembly 15; i.e., the substrate 20 has a circumferential flatness within 4 mils (.004 inch) total indicated runout (TIR) per quadrant and radial flatness of .6 mil (.0006 inch) per inch for operation with the "fying" heads 15a. A typical disc 12, as shown, is approximately fourteen inches in diameter and a suitable aluminum alloy for record disc 12 contains zinc 5.1 to 6.1%, magnesium 2.1 to 2.8%, copper 1.2 and 2.0% and chromium 0.18 to 0.4%. The surfaces of the disc substrate 20 are lapped to provide an extremely smooth or polished surface to eliminate all spikes or other sharp discontinuities exceeding a predetermined height and gradient to provide the desired uniform smoothness for operation with the closely spaced "flying" heads 15a.

In FIG. 2, the greatly enlarged cross section of a small portion of the top record surface 14 of the disc 12 shows typical relative thickness of the thin-films of a typical record surface and the thicknesses are shown in proper proportion to clearly illustrate the features of the present invention. The bottom record surface 16 is identical in construction to the top surface 14 which includes a magnetic record medium 24 of cobalt-phosphorous plated on a non-magnetic nickel layer 22 that is formed on zinc treated aluminum disc substrate 20.

The top and bottom record surfaces 14 and 16 are formed on the surfaces of the record disc 12 following a thorough cleaning providing for vapor de-greasing of substrate 20 by a solvent for organic materials and removal of particulate material and elimination of surface electrostatic charged by a non-etching aluminum cleaning solution following by a spray rinse of distilled or deionized water. The cleaning further includes immersion in a 1:1 (by volume) solution of nitric acid ($HNO_3$) at room temperature for 15 seconds ($\pm 5$ seconds) followed by a spray rinse.

After the thorough cleaning, the disc substrate 20 and the surfaces thereof are prepared for the record surfaces 14 and 16 by providing a smooth layer of zinc (flashing) by a first immersion in a zincate solution at room temperature (70° F.) for 30 seconds ($\pm 10$ seconds) followed by a spray rinse and immersion in a solution of nitric acid and another spray rinse. The first zinc "flashing" is removed by the nitric acid to provide for extremely smooth zinc treated substrate surfaces after a second immersion in the zincate solution which is followed only by a spray rinse.

Having prepared the substrate 20, the disc 12 is immersed in a nickel solution (including sodium hydrophosphite) for electroless deposit of the non-magnetic nickel-phosphorous, thin-film layer 22 having a thickness approximately in the range of 30 to 100 microinches. The phosphorous content of the layer 22 is in the preferred range of 8% to 15% by weight. This is important because the layer 22 has been found to exhibit magnetic properties when the disc is heated, as described later, to provide the protective overlayer of oxides, for example. The nickel layer 22 provides a hard base providing for firm adherence of the next plating of the thin-film of cobalt-phosphorous (Co-P) recording medium 24. The nickel layer 22 has the characteristic of remaining non-magnetic only when higher temperatures to 290° C. are not exceeded as required in processing of the cobalt-phosphorous (Co-P) to form the overlayer of oxides thereof described infra. It should be noted that the nickel layer is preferably in the lower range of thicknesses, i.e., 30 to 50 microinches, to avoid "taking on" magnetic characteristics to the extent of affecting the recording of data when the higher temperature range (i.e., above 270° C. and up to 290° C.) is employed for formation of the protective overlayer 26.

The processes for forming the overlayer of oxides involve baking at temperatures in the range from 200° C. to 290° C. The nickel layer becomes extremely hard when baked at these temperatures. Thus one of the more important features of the present invention is the provision of the non-magnetic nickel layer as the substrate for the cobalt-phosphorous record medium in that the nickel layer provides a harder substrate than chomium, for example, and is applied by an electroless process which is simpler than any other process, such as an electrolytic process (electroplating) for copper, while providing a substantially more uniform (smooth) surface of constant thickness. Control of the thickness of the nickel layer 22 including uniformity in the thickness is important in that it has been found that the layer exhibits undesired magnetic characteristics after baking at higher temperatures in the range above 270° C. to 290° C. when the nickel exceeds predetermined thicknesses above 50 microinches. Accordingly, to prevent the nickel layer from becoming magnetic, the lower range of thicknesses (35–50 microinches) is preferred. Further, the critical temperature for the aluminum substrate is 270° C. and warping or other adverse changes can be expected to occur at temperatures above 270° C. although in most instances such adverse changes have not been observed and the aluminum alloy disc appears to be capable of withstanding the higher temperatures. The thin-film cobalt-phosphorous magnetic record medium, preferably 14 to 18 microinches for high density recording, is formed by electroless deposition over the layer of nickel by immersion of the nickel plated disc 12 in a cobalt solution containing cobalt chloride, sodium citrate, sodium hypophosphite, ammonium chloride, and sodium lauryl sulfate for 10 to 15 minutes at 80° C. to 85° C., followed by a spray rinse and forced air drying. Phosphorous, approximately 5% by weight, is present with the cobalt in the thin-film so formed on the plated disc 12 to provide superior magnetic recording characteristics including high coercivity of approximately $330 \pm 30$ oersteds. As noted briefly before, the thickness of the thin-film of cobalt-phosphorous is important because a thin-film must be continuous to provide for continuous recording along data tracks formed thereon during recording operations. Also, to obtain uniformity in recordings and signal reproduction, the cobalt (C-P) thin-film must be uniform not only to provide a more uniform spacing to the record heads but also to provide a minimum thickness for magnetic flux densities capable of detection during reproduction to produce the desired signal amplitudes. The limitation on the maximum thickness of the cobalt (Co-P) is to obtain the desired resolution of the recording since the demagnetization increases with thickness of the magnetic thin-film record medium. Accordingly, the maximum recording density (flux reversals per linear inch) decreases with increase of thickness. The broader range of thicknesses from 2 to 26 microinches of cobalt (Co-P) provides for satisfactory operation at high recording densities including those above approximately 3000 flux reversals per linear inch and up to 10,000 flux reversals per linear inch. Even thinnner thin-films of cobalt (Co-P) are satisfactory except for the difficulties involved in providing a continuous thin-film of cobalt (Co-P). The preferred surface roughness of the cobalt (Co-P) record medium, for operation with closely spaced "flying" head structures, is approximately 3 microinches CLA (center level average) with maximum irregularities of $\pm 15$ microinches. Further, the preferred surface has approximately 1623 surface reversals, for example, of 1 microinch or greater (at levels over 2 microinches CLA) per .005 inch trace of the surface as detected by a surface roughness tester.

Protection of the cobalt (Co-P) record medium 24 is provided by the combination of the thin-film oxide overlayer 26 and lubricant 28. The protection provided by the thin-film overlayer of cobalt oxides 26 formed directly on the surface of the cobalt (Co-P) record medium by oxidation thereof is dependent to a great extent upon the oxides being firmly bonded to the cobalt (Co-P) record medium and so that the overlayer does not shed when submitted to abrasion with microcut paper. The thin-film protective overlayer of oxides comprises oxides of cobalt including cobalt oxides $CoO$, $Co_2O_3$ and $Co_3O_4$. It is important also that the thin-film oxide overlayer be sufficiently hard to withstand wear. In order to provide this firmly bonded overlayer of oxides, several methods of oxidation of the cobalt (Co-P) record medium have been found to be preferable.

A first method of forming a firmly bonded protective overlayer of oxides of the record medium is the polymer coating-baking process which comprises the following steps: (1) coating the cleansed surfaces of the cobalt-phosphorous plated record disc with a synthetic polymer, and (2) baking the record disc at a temperature of approximately 270° C. (preferably at least 260° C. and within the temperature range from 260° C. to 290° C.) for a time period from 18 to 24 hours at 270° C. and for longer time periods at lower temperatures closer to 260° C. and shorter time periods at higher temperatures, i.e., 8 to 12 hours at 290° C. The synthetic polymer thin-film is removed during baking at temperatures over 190° C. The baking at 270° C. for the prescribed range of time periods produces the hard thin-film protective overlayer of cobalt oxides firmly bonded to the cobalt (Co-P) record medium. The provision of the polymer coating, before baking, controls the formation of a uniform thin-film of oxides of cobalt on the surface to produce a uniform protective overlayer firmly bonded thereto.

A second method of forming a uniform protective overlayer of cobalt oxide firmly bonded to the cobalt (Co-P) record medium is by chemical treatment of the surface followed by baking which comprises the following steps: (1) immersing of the cleansed cobalt record disc in a dilute nitric acid (0.16% to 2.0% $HNO_3$ by weight) for five minutes (range of 1 to 6 minutes) and rinsing immediately with deionized water, and (2) baking the record disc for ½ hr. to 4 hrs. at a temperature of approximately 230° C. to 260° C. (preferably at 260° C. for ½ hr.). The solution is not intended to etch the cobalt (Co-P) surface and preferably should not cause removal of any of the metal but only prepare the surface for baking, e.g., form a monomolecular surface of oxides.

A third method of forming a thin-film protective overlayer of oxides is electro-chemical comprising electrolytic anodizing of the cleansed cobalt (Co-P) surface of the record disc in a dilute sodium hydroxide solution with or without a small amount of benzoic acid or anodizing of the surface in a dilute sodium carbonate with a small amount of phenol.

The first and second methods are preferred to the third method which does not include baking to produce the overlayer of oxides. The methods including baking readily provide overlayers firmly bonded to the cobalt which is important to the suitability of the disc under present conditions for recording.

Formation of the desired uniform and firmly bonded overlayer of oxide on the cobalt (Co-P) record medium and other desired properties and characteristics of the overlayer are strongly influenced by the condition of the record medium as a substrate for the overlayer. The crystal structure of the substrate influences the growth of the crystal structure of the thin-film overlayer of oxides. Further, contaminates on the surface of the substrate prevent uniform growth of the oxides of cobalt and the influence extends to several thousand angstrom units (which influence would not be readily evident in "bulk" overlayers, i.e., over 10,000 angstrom units).

In accordance with the present invention the cobalt (Co-P) record medium is treated prior to baking in order to obtain the desired uniform thin-film protective overlayer in the range of 1 microinch to 5 microinches. Coating of the disc with polyamide resins provides protection from contamination before and during the initial period of baking. The polyamide coating is removed from the surface of the cobalt (Co-P) record medium by the high temperatures (above 170° C., e.g., 270° C.) to produce a thin-film protective overlayer during the entire baking time period. The nitric acid treatment process provides for removal of all contamination of the cobalt surface and provides uniform oxidizing (preferably no etching) during baking to form a uniform thin-film protective overlayer firmly bonded to the cobalt (Co-P). In addition, the nitric acid process is considered to provide for the formation on the surface of the cobalt (Co-P), of at least a monomolecular layer of cobalt oxide, i.e., a layer having a thickness of a few angstrom units to one (1) microinch. Immersion of the disc in the most dilute solution of nitric acid (e.g., .2%) for a short period of time (e.g., 5 minutes) will not produce a readily visible overlayer of oxides and, in most instances cannot be detected even by X-ray diffraction.

The formation of these oxides by immersion in dilute nitric acid provides the base for the formation of 1 to 5 microinches of the overlayer of oxides resulting after baking which are firmly bonded to the cobalt (Co-P) record medium and tightly bonded to other oxides of the overlayer. It should be noted that oxides of cobalt can be formed by other processes than the present methods of processes disclosed herein but these other processes should be clearly distinguished as they do not form a firmly bonded overlayer of oxides, i.e., the latter oxides are removed by the slightest abrasive contact including some instances in which the oxides shed at the slightest touching of the overlayer.

In accordance with the first method described supra (using the polyamide coating-baking process), the cobalt (Co-P) plated record disc is dried and the individual surfaces of the disc are cleansed of surface contamination by rotating (in a horizontal plane) at a speed greater than 3000 r.p.m. (revolutions per minute) and repeatedly spraying a solvent such as butanol thereon, and wiping with a lint-free cloth followed by a final spraying and continuing rotation of the disc until the solvent has evaporated. This cleansing operation is repeated until the cobalt (Co-P) surface of the disc 12 is determined to be free of surface contamination. The thin-film coating of polymer is then applied to the cleansed surface of dry cobalt 24, for example, by spraying it with polymer solution while rotating the disc in the approximate speed range of 50 to 250 r.p.m. until it is completely covered by the solution. The spraying time and the rate of application can be varied to yield a synthetic polymer thin-film thickness anywhere within the desired range of 2 to 24 microinches. The rotation of the disc 12 is continued until the polymer coating is visibly dry. The other surface 16 of the disc 12 is coated by the synthetic polymer in the same manner. A particular polyamide resin for this application, known as "Versamid 935," a trademarked product of General Mills, Incorporated, Kankakee, Ill., has been found to provide the aforementioned characteristics of adherence and strength when applied in equal parts by weight of amyl acetate, ethanol and butanol from a solution containing 4% resin. It should be noted that this polyamide resin is soluble in alcohol which distinguishes it from spuer-polyamide resins commonly known as nylon 6/6, 6, 6/10 or 11, for example. Polyamide resin (Versamid 935) is derived from the reaction of dimerized linoleic acid with diamines or polyamines and has a softening point of 130° C. Polyamide resins in the group which includes "Versamid 935" are of importance in the present invention to provide suitable coatings. These resins have a molecular weight range from 5,000 to 10,000 and are produced by interaction between dibasic acids of the type HOOC—R—HOOC and diamines or polyamines of the type $H_2N—R'—NH_2$ where R generally contains 34 carbon atoms, R' is generally of the polymethylene type $—(CH_2)_n$, and where $n$ is any one number between 2 and 6, inclusive.

The more uniform thin-film polymer coating for discs is provided by spraying or dipping and spinning where a sufficient amount of the polyamide solution is present to avoid streaking of the surface.

Synthetic polymer thin-film coatings formed from a solution of resin or resin blends are applied to both surfaces of the disc 12. The thickness of the polymer overlayer is important and, more specifically and accurately, the thickness of a particular thin-film polymer overlayer should be uniform. The range of thicknesses of the polymer thin-films is from 600 A. to 6000 A.

The last step in any of the three methods discussed supra, which is very important in the process of forming the record surface 14, is the provision of the thin-film lubricant 28. The thin-film lubricant found to provide the most desirable characteristics for the record surface is silicone oil which is applied to the cobalt oxide protective overlayer by polishing followed by cleansing preferably with lint-free cloth or heavy-duty lint-free paper wiper tissues, to remove excess amounts of silicone oil deposited thereon. The actual conditions under which the lubricant is to provide low coefficients of friction (static and dynamic) have been set forth supra in the description of the disc recording equipment. It was noted that the record heads and head structure make either momentary or sustained direct contact with the disc because of the close proximity of record heads and structure to the record surface of the disc 12, e.g., 50 microinches spacing. Further, it has been found that the direct contacts made between the disc record surface and the heads are under extremely slight pressure and the lubricant provides a minimum of friction under slight pressure to prevent the initial direct contact of the heads and other closely spaced head structure from "digging" into the record surface. It can be appreciated that a record surface having a higher coefficient of friction (e.g., a non-lubricated oxide overlayer) would tend to drag the suspended heads and head structure into the surface after initial direct contact causing tilting of the head structure and causing galling of the oxide overlayer and record surface. Accordingly, only a thin-film of lubricant need be provided to inhibit any further increased pressure of direct contact. The hard overlayer of oxides of the cobalt record medium serve to adequately protect the cobalt record medium under conditions in which the lubricant is provided to inhibit galling of the record surface. Thus, it should be evident that the combination of the thin-film of oxides of the cobalt (Co-P) record medium and the thin-film of lubricant serve to protect the record medium while also permitting close-spacing of the record heads for high density recording when desired. Also, it should be noted that it is much more difficult to provide thicker overlayers of oxides for added protection of the record medium, i.e., the formation of a thin-film of oxides firmly bonded to the cobalt (Co-P) record medium is readily obtained in the baking process whereas a thicker overlayer of oxides is substantially more difficult and time consuming. Accordingly, even for recording systems of lower density in which it is permissible to have thick protective overlayers, the thin-film lubricated oxides are still preferable over thick layers. Also, it has been found that only a thin-film of silicone oil lubricant or other lubricants provides all the desired advantages of preventing the disc record surface from being subjected to increased abrasion or galling of the record heads, and a thick film or layer would have the disadvantages of flaking and causing buildup of loosened material on the record heads which would require frequent maintenance and cleansing for continued proper operation in recording and reproducing data.

In addition to the preferred lubricant silicone oil, thin-films of other lubricants having desirable low static and dynamic characteristics are disclosed in the copending patent application of Peters et al., Ser. No. 598,292. The advantage of the silicone oil lubricant over the wax type lubricants described in the Peters et al. patent application is the simplicity in application as compared to the difficulty of providing a thin-film of wax lubricants which is not of varying thickness and is not firmly bonded to the polymer overlayer such as to produce "flaking" or separation from the overlayer or internally, i.e., separation of wax lubricants from itself where the lubricant is thicker than a thin-film.

Certain combinations of wax or wax-silicone lubricants have been found to be suitable because only a thin-film buildup occurs even when successive applications are made to the protective overlayers. The solvents for the wax or wax-silicone lubricants dissolve the thin-film of prior applications and leave only the desired thin-film of lubricant.

Application of the preferred silicone oil lubricant includes the step of cleansing excess silicone oil from the protective overlayer of oxides until the lubricated record surface is dry. The dry record surface retains a thin-film of silicone oil which is distinguishable from a wet record surface before the excess silicone oil is removed by a thorough buffing or wiping with lint-free towels. A "wet" record surface is not desirable because of the problems of accumulation of the oil on the record heads and contamination of the record surface by the attraction and adherence of dust, lint and foreign particles to the lubricated record surface. The dry, lubricated record surface does have a higher static friction coefficient than wax lubricants. However, the disc record system shown and disclosed earlier herein provides that the discs 12 be moving at recording speed prior to radial positioning and moving of the record head close to the respective record surfaces for recording and reproducing operations, i.e., desirable proximity of 30 to 50 microinches. Thus, the static friction coefficient is not as important in the present disclosure of the record system as other record systems in which the record heads touch the record surface while the discs are stationary and starting of the discs in motion includes the consideration of the static coefficient of friction. The silicone oil lubricated record surface having approximately these static and dynamic friction coefficients produces the desired abrasion and galling resistant characteristics wherein the dynamic friction coefficient provides the desired lower friction for a moving record surface or portion thereof coming into direct contact with a record head. For example, a 14-inch diameter rotating disc (1400 r.p.m.) coming into momentary direct contact with a "flying" head formed of an aluminum alloy produces a pressure by direct contact of substantially less than ten pounds per square inch. Thin-films of lubricant having thicknesses to 3600 A. have the desired properties but do require corresponding greater spacing of the record head and resulting decrease in maximum density of recording. Above 3600 A., it has been found that "flaking" of a thin-film of a wax lubricant often occurs upon contact with the record head during recording (including both recording and reproducing operations). Also, and a very important feature of the protective overlayer of the present invention, is the superior protection of the thin-film of cobalt-phosphorous (and other thin-film magnetic metal recording mediums) over any other known protective overlayers including rhodium, polymer films or combinations thereof for example.

Having considered some of the important aspects of the resin or resin blend type of overlayer, the very important feature of the provision of the lubricant of record surface is now considered in further detail. Because of the many critical factors involved in data recording systems, it should now be clear that the use of lubricants is desirable in most instances only when the overall thickness can be limited to provide the desired minimum record head to recording medium spacing and thereby maintain high recording densities. Further, the lubricant must not only be extremely thin (100 A. to 3600 A.), but also be uniformly adherent to the resin overlayer and should be of uniform thickness in order to maintain the overall uniform thickness of the record surfaces. In practice, a uniform thin-film of lubricant varying only from a monomolecule to a few molecules in thickness has been found to be the most advantageous thickness since the adsorption into the overlayer of oxides retains the lubricant and significant loss occurs only if the adsorbent outer surface of the overlayer of oxides is removed.

In general, it has been found to be extremely difficult to provide a suitable lubricant, particularly where the lubricant is the outer surface of the record member, which engages the record heads. Under this condition, it is vital that the lubricant not build up or accumulate on the record heads or record surface during recording. This does not imply that it is not desirable to provide a uniform lubricated protective surface on the face of record heads for engaging tapes and tape strips or other recording systems. Retention of a lubricated record head face is difficult to provide for a suitable length of time when record surfaces engaging the record head face are not lubricated. The present invention provides a lubricant having the foregoing features and advantages and avoids the problems characteristic of lubricants by applying a thin-film only of lubricant to the record surface.

The use of silicone oil as a lubricant in combination with a thin-film of oxides for record surfaces has unexpected advantages considered important to its ability to withstand abrasion and galling upon direct contact with a "flying" record head in a disc type system shown in FIG. 1. This advantage is attributed to its low dynamic coefficient of friction.

It is important to note that the present invention provides for retention of a lubricant having particularly advantageous characteristics for protection of a highly polished metal surface required for magnetic recording at high densities. The requirements of uniform smoothness of this metal surface are such that surface irregularities do not exceed 15 microinches R.M.S. (root-mean-square) and preferably a much more uniform smoothness of 3 microinches R.M.S. Accordingly, this type of bare metal surface has a very poor lubricant retention ability, and a thin-film of lubricant applied directly to the surface is not retained thereon to provide a protection for the desired length of time for use in recording systems. Accordingly, a smooth lubricated surface is more difficult to obtain on bare metal surfaces than over an oxide thin-film overlayer which overlayer absorbs only a small amount of the lubricant to provide a durable, continuous, uniform record surface having a very low dynamic coefficient of friction. However, the lubricant is sufficient and durable and in addition to the other features provides the important feature of protection of the thin-film record medium against corrosion to an extent not heretofore known.

Important advantages of using nickel as a substrate for the thin-film cobalt-phosphorous record medium is that cobalt and nickel have similar chemical and physical characteristics which is readily apparent from the fact that they are adjacent on the "Periodic Table of Chemical Elements," i.e., adjacent atomic numbers 27, 28, respectively, and therefore have similar outer electronic arrangements; and also close atomic weights 58.94, 58.71 and therefore similar chemical and physical properties. Accordingly, it is desirable to provide nickel as a substrate for cobalt to prevent interaction thereof as compared to copper as a substitute substrate for cobalt for example. The use of copper or other materials as a substrate for cobalt is much less desirable because of lack of similarity of properties with the metal cobalt. Thus, even though care must be taken not to permit the non-magnetic layer of nickel from becoming magnetic due to excessive heating, for example, the advantages of providing nickel as a substrate for the cobalt record medium are important in the resulting superior record member. This can be of even greater importance when each record surface is comprised of a plurality of thin-film layers of the cobalt (Co-P) record medium and each thin-film layer is separated by a layer of non-magnetic nickel. Such a multi-layer record surface construction provides for a higher track density recording on the record member. Selective recording on each one of the plurality of layers of the record medium of a record surface is enhanced by varying the coercivity of the layers and/or the separation of the record tracks for each layer to provide for this higher track density. Preferably, the lower the depth of the layer of the record medium, the higher the coercivity of the layer; and the record current and resulting intensity of the magnetic field of the record head or heads is controlled to record at any selected one of the thin-film layers of the record medium.

In the light of the above teachings, therefore, various modifications and variations of the present invention are contemplated and will be apparent to those skilled in the art without departing from the spirit and scope of the invention.

What is claimed is:

1. The method of providing a protective overlayer for the magnetic record surface of a record member which method comprises the following steps: providing a uniform metallic thin-film of magnetic material; preparing the surface of said metallic thin-film for oxidation by immersion in a dilute solution of nitric acid for a short period of time wherein etching of said metallic thin-film is substantially avoided; heating said surface for a time period to form and firmly bond oxides on the surface of the metallic thin-film; and applying a lubricant to the oxidized surface to reduce the coefficient of friction of said oxidized surface.

2. The method of claim 1 in which the dilute solution of nitric acid is approximately .16% to .25% by weight of nitric acid.

References Cited

UNITED STATES PATENTS

| | | | |
|---|---|---|---|
| 3,102,048 | 8/1963 | Gran et al. | 117—237 X |
| 3,245,826 | 4/1966 | Luce et al. | 117—239 X |
| 3,321,328 | 5/1967 | Koretzky | 117—239 |
| 3,327,297 | 6/1967 | Croll | 117—239 X |
| 3,350,180 | 10/1967 | Croll | 117—240 X |
| 3,353,986 | 11/1967 | Mathias et al. | 117—239 |
| 3,423,233 | 1/1969 | Akashi et al. | 117—235 X |
| 3,460,968 | 8/1969 | Bate et al. | 117—237 X |
| 3,466,156 | 9/1969 | Peters et al. | 117—75 X |

OTHER REFERENCES

Arcus et al.: February 1965, pp. 738 and 739, vol. 7, No. 9, IBM Technical Disclosure Bulletin.

Brock et al.: December 1966, p. 757, vol. 9, No. 7, IBM Technical Disclosure Bulletin.

WILLIAM D. MARTIN, Primary Examiner

B. D. PIANALTO, Assistant Examiner

U.S. Cl. X.R.

117—239, 240